No. 796,545. PATENTED AUG. 8, 1905.
H. F. WATSON.
COMPOSITE BOARD.
APPLICATION FILED OCT. 11, 1901. RENEWED JAN. 5, 1905.

Witnesses:
Harold G. Barrett
M. Somerville

Inventor
Henry F. Watson,
By Geo. E. Ubaldo,
Atty.

UNITED STATES PATENT OFFICE.

HENRY F. WATSON, OF VALPARAISO, INDIANA, ASSIGNOR OF ONE-HALF TO J. P. GOETTER, OF OAK PARK, ILLINOIS.

COMPOSITE BOARD.

No. 796,545.          Specification of Letters Patent.          Patented Aug. 8, 1905.

Application filed October 11, 1901. Renewed January 5, 1905. Serial No. 239,734.

*To all whom it may concern:*

Be it known that I, HENRY F. WATSON, a citizen of the United States, and a resident of Valparaiso, in the county of Porter and State of Indiana, have invented an Improved Composite Board, of which the following is a specification.

This invention relates to composite board, and relates particularly to composite board consisting of thin pieces or laminæ of desired material secured together by means of a suitable bonding agent.

Among the objects of the invention are to produce a composite board having a wooden surface which is adapted for use in building, particularly for flooring and the like, to produce a composite wooden board in imitation of veneers adapted for use for interior finishing, cabinet-work, &c., and also to produce a composite board in imitation of figured woods, as curly maple or birch, walnut-knurls, &c.

A composite board of my invention consists of the various features, combinations of features, and details of construction hereinafter described and claimed.

In the accompanying drawings my improved composite board is fully illustrated.

Figure 1:
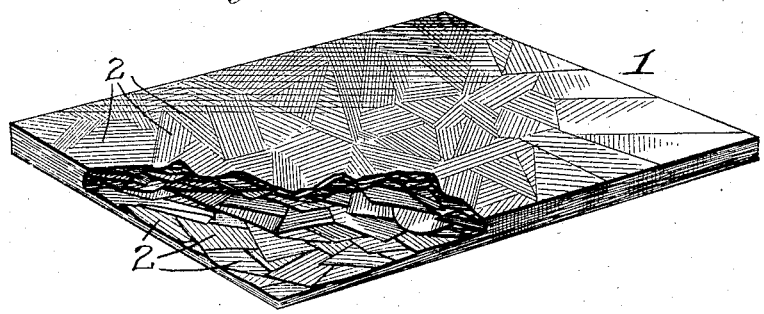
Figure 2:
Figure 3:
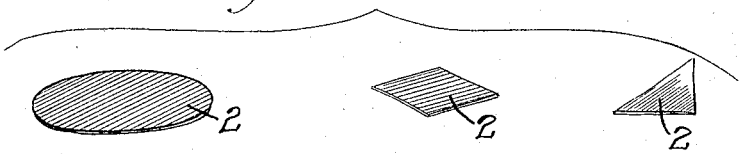
Figure 4:
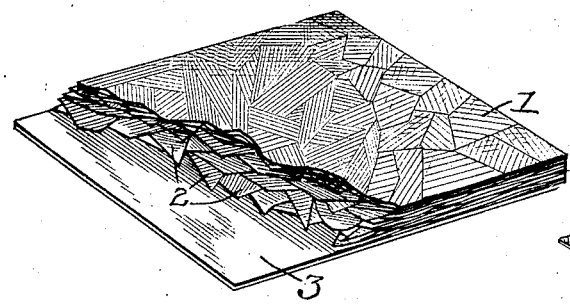
Figure 5:
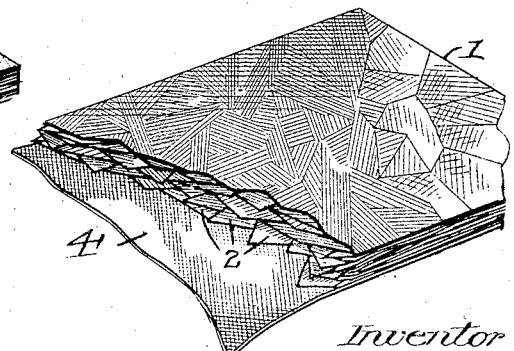

Figure 1 is a perspective view of a piece of composite board of my invention, broken away at one corner to better illustrate the structure thereof. Fig. 2 is a sectional view thereof. Fig. 3 comprises face views of different forms and sizes of laminæ adapted for forming a composite board of my invention, and Figs. 4 and 5 illustrate modifications of composite board of my invention.

A composite board of my invention (designated in the drawings by 1) consists of thin pieces or laminæ 2, comprising pieces or laminæ which are differentiated from each other either in color, disposition of the grain thereof, hardness, or in other manner The pieces or laminæ 2 are secured together by means of a suitable bonding agent and are arranged so that they will overlap and interlock. The size and shape of the pieces or laminæ 2 admit of a wide range of variation not only in different boards, but in the same board. In practice I have attained good results by the use in the same board of pieces or laminæ varying in size from one-sixteenth to five-eighths of a square inch in superficial area, rectangular, triangular, circular, and irregular in outline and from .01 to .02 of an inch in thickness.

In the drawings the pieces or laminæ 2 are of the same kind of wood throughout and are differentiated from each other by being disposed promiscuously, so that the grain of different pieces will run in different directions.

After being laid, bonded, and compacted a surface of the board is preferably dressed by suitable means. This dressing process will render the surface of the board perfectly smooth and will also operate to blend exposed laminæ, either their color, grain, or other distinguishing features, imparting to the surface of the board a clouded or mottled and highly ornamental appearance very closely resembling natural figured woods.

Composite boards of my invention may be formed either from pieces or laminæ of the wood which it is desired to imitate, as walnut, mahogany, cherry, or the like, or they may be formed from laminæ of cheap woods, as basswood or the like, and then stained and finished in imitation of natural woods.

Where laminæ of different degrees of hardness are used, the harder laminæ become embedded in the softer when the board is compressed and when the surface is dressed produce an inlaid effect.

In Figs. 4 and 5 of the drawings I have illustrated modifications of composite boards embodying my invention. In the modification illustrated in Fig. 4 a layer of composite board like that heretofore described is combined with a foundation layer 3 of mica board constituted in the usual manner of scales or laminæ of mica. The backing or foundation of mica board imparts strength and durability to the structure without increasing the cost thereof.

In the modification shown in Fig. 5 a composite board like that first herein described is laid upon and firmly secured to a backing or foundation 4, of canvas or the like. Board of this construction is especially adapted for use as flooring and on curved surfaces, as on the coves of the salons of steamships, in finishing the interiors of cars and the like, where tenacity is more requisite than strength.

A composite board of my invention may be made of any desired thickness, ranging in most cases from one-sixteenth of an inch to three-eighths or one-half of an inch, depending upon the use to which it is to be put.

While I prefer to form my composite board from thin pieces or laminæ arranged or laid in substantially parallel positions, as shown, I do not desire to be limited thereto, as my invention also contemplates arranging said pieces or laminæ promiscuously and without regular order.

I claim—

1. A composite board a surface of which consists of overlapping and interlocking scales or laminæ and comprising scales or laminæ differentiated from each other and a bonding agent which secures said scales or laminæ together, substantially as described.

2. A composite board a surface of which consists of overlapping and interlocking scales or laminæ and comprising scales or laminæ differentiated from each other and a bonding agent which secures said scales or laminæ together, said surface being dressed, substantially as described.

3. A composite board a surface of which consists of overlapping and interlocking scales or laminæ of wood arranged promiscuously and a bonding agent which secures said scales or laminæ together, substantially as described.

4. A composite board a surface of which consists of overlapping and interlocking scales or laminæ of wood, comprising scales or laminæ differentiated from each other and a bonding agent which secures said scales or laminæ together, substantially as described.

5. A composite board a surface of which consists of overlapping and interlocking scales or laminæ differentiated from each other and a bonding agent which secures said scales or laminæ together, said surface being dressed, substantially as described.

6. A composite board comprising a base or foundation plate and a layer secured thereon consisting of overlapping and interlocking scales or laminæ and a bonding agent which secures said scales or laminæ together, substantially as described.

7. A composite board comprising a base or foundation of canvas, or the like, and a layer secured thereon consisting of overlapping and interlocking scales or laminæ and a bonding agent which secures said scales or laminæ together, substantially as described.

In testimony that I claim the foregoing as my invention I affix my signature, in presence of two subscribing witnesses, this 25th day of September, A. D. 1901.

HENRY F. WATSON.

Witnesses:
  FRANK A. TURNER,
  JOSEPH S. BARTHOLOMEW.